(No Model.)

U. P. SMITH.
PNEUMATIC TIRE.

No. 605,523. Patented June 14, 1898.

Witnesses:

Inventor:
Uzziel P. Smith,
By Banning & Banning & Sheridan,
Att'ys

UNITED STATES PATENT OFFICE.

UZZIEL P. SMITH, OF CHICAGO, ILLINOIS.

PNEUMATIC TIRE.

SPECIFICATION forming part of Letters Patent No. 605,523, dated June 14, 1898.

Application filed December 29, 1897. Serial No. 664,163. (No model.)

*To all whom it may concern:*

Be it known that I, UZZIEL P. SMITH, a citizen of the United States, residing at Chicago, in the county of Cook and State of Illinois, have invented certain new and useful Improvements in Pneumatic Tires, of which the following is a specification.

My invention relates particularly to that class of pneumatic tires known as "clencher-tires," and especially to the means by which the tire is held in position and engagement with the rim.

The object of my invention is to provide simple, economical, and efficient means for holding a pneumatic tire of the clencher type in position and in engagement with the rim; and the invention consists in the features, combinations, and details of construction hereinafter described and claimed.

Figure 1:
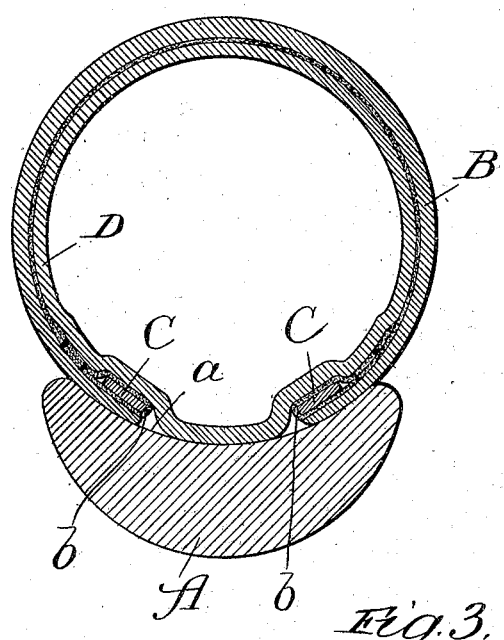
Figure 2:
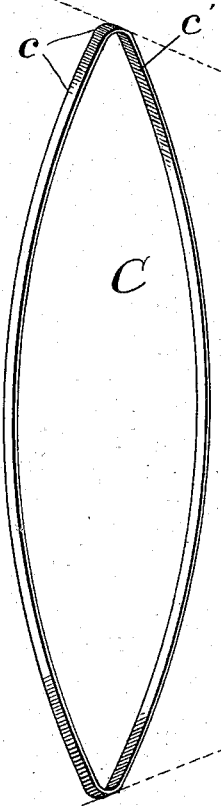
Figure 3:
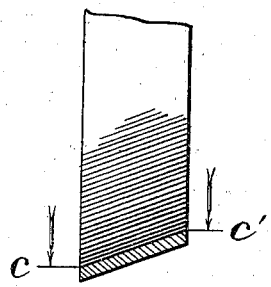

In the accompanying drawings, Figure 1 is a transverse sectional view taken through a wheel rim and tire constructed and arranged in accordance with my improvements; Fig. 2, a perspective view of one of the flaring rings by which the tire is held in place, and Fig. 3 an enlarged detail view showing a section of the flaring securing-ring.

In the art to which this invention relates it is well known that clencher-tires—that class of pneumatic tires which are held in place by the inflation of an inner extensible core—require rims made in a particular manner, which prevents ordinary wheel-rims from being used in connection with a clencher-tire. My invention, therefore, is intended primarily to provide a clencher-tire of such construction and arrangement that it can be used in connection with an ordinary rim, so that the rider can have at his command either a clencher or an ordinary cemented pneumatic tire, as desired.

A further object of my invention is to provide simple economical means for securing the tire in position.

In constructing a tire in accordance with my improvements I prefer to use a wheel-rim A of the usual type—viz., a wheel-rim which is crescent-shaped in cross-section—that is, having a plane concaved peripheral groove *a*—to which a pneumatic tire in the shape of a regular tubular annulus may be cemented.

In making my improved type of tire I provide an outer sheath or casing B, which is rifted circumferentially on its inner side, so that its lateral edges *b* are preferably situated some distance apart, though this is not absolutely necessary. Adjacent to these lateral edges and preferably embedded in the tire-sheath are two flaring metallic rings C so constructed and arranged that the plane in which they lie is practically coincident or tangent with the concaved surface of the peripheral groove. In this arrangement a line drawn from the lateral edge *c* to a point directly opposite on the same lateral edge would be diametrically larger than a line drawn from the opposite lateral edge *c'* to a point diametrically opposite. In other words, the lateral edges of the securing-rings are of different diameters, first, for the purpose of enabling the lateral edge of the tire to be readily removed or inserted in place, and, second, so that it will more readily conform to the contiguous rim-surface and assist in locking the tire in position. It is not absolutely necessary that the securing-rings be made in this flaring shape, but I consider it preferable.

As will be observed from an inspection of Fig. 1 of the drawings, it will be seen that the inner diameter *c'* of the flaring ring is less than the diameter of the concave wheel-rim. It will also be observed that this continuous ring or band is embedded in the tire-sheath. The peculiar advantages derived from this construction are, first, that it is practically impossible to so inflate the tire as to strip the sheath from its engagement with the wheel-rim; second, the tire-sheath may be placed on the wheel or removed therefrom with facility, and, finally, the user has his option to use either a double-tube tire or a single-tube tire in combination with what is known as a "crescent" wooden rim.

In the clencher type of tire it is advisable to use an inner tube D, which is preferably inserted between the sheath or casing and the wheel-rim, so that as it is inflated and expanded it acts to force the securing-rings apart and lock them firmly against the grooved peripheral surface of the rim.

The advantages incident to a tire constructed in accordance with my improvements are, first, that it can be used in connection with the ordinary bicycle-rim; second, that it can be used practically in connection with almost any type of rim; third, that there is no necessity for an additional central peripheral groove on the wheel-rim for clearance, and, fourth, that the tire is very simple and economical to manufacture and very efficient in operation.

While I have described my invention with more or less minuteness as regards details and as being embodied in certain precise forms, I do not desire to be limited thereto unduly or any more than is pointed out in the claim. On the contrary, I contemplate all proper changes in form, construction, and arrangement, the omission of immaterial elements, and substitution of equivalents, as circumstances may suggest or necessity render expedient.

I claim—

As a new article of manufacture, a pneumatic tire provided with an outer sheath slitted circumferentially at its inner surface and provided with two continuous flat metallic flaring bands the inner diameter of which is smaller than the outer diameter of the wheel-rim and embedded in the sheath at or near its lateral edges, and a wheel-rim provided with a concave peripheral groove of larger diameter at its lateral edges than the inner diameters of the flaring rings, substantially as described.

U. P. SMITH.

Witnesses:
 THOMAS F. SHERIDAN,
 EPHRAIM BANNING.